US007076471B2

(12) United States Patent
Todoroki et al.

(10) Patent No.: US 7,076,471 B2
(45) Date of Patent: Jul. 11, 2006

(54) FILTERING METHOD AND APPARATUS

(75) Inventors: Akinari Todoroki, Hachioji (JP);
Fumihito Baisho, Tachikawa (JP)

(73) Assignee: Seiko Epson Corporation, Tokyo (JP)

( * ) Notice: Subject to any disclaimer, the term of this patent is extended or adjusted under 35 U.S.C. 154(b) by 501 days.

(21) Appl. No.: 10/046,698

(22) Filed: Jan. 17, 2002

(65) Prior Publication Data

US 2002/0147752 A1    Oct. 10, 2002

(30) Foreign Application Priority Data

Feb. 15, 2001 (JP) ............................. 2001-038935

(51) Int. Cl.
  *G06F 17/14* (2006.01)
(52) U.S. Cl. ................................... 705/402
(58) Field of Classification Search ............... 708/400, 708/401, 402
  See application file for complete search history.

(56) References Cited

U.S. PATENT DOCUMENTS

| 6,119,080 | A | * | 9/2000 | Liu et al. ..................... 704/203 |
| 6,125,212 | A | * | 9/2000 | Kresch et al. ............... 382/250 |
| 6,856,262 | B1 | * | 2/2005 | Mayer et al. ................. 341/50 |
| 2002/0106020 | A1 | * | 8/2002 | Cheng et al. ............ 375/240.2 |

FOREIGN PATENT DOCUMENTS

| JP | A-07-210196 | 8/1995 |
| JP | 08-279758 | 10/1996 |
| JP | A-2000-286713 | 10/2000 |
| JP | A-2000-323993 | 11/2000 |
| JP | A-2001-356799 | 12/2001 |

OTHER PUBLICATIONS

Konstantinos Konstantinides, "Fast Subband Filtering in MPEG Audio Coding," IEEE Signal Processing Letters, vol. 1, No. 2, pp. 26-28, Feb. 1994.
Scott B. Marovich, "Faster MPEG-1 Layer III Audio Decoding," Computer Systems and Technology Laboratory, Hewlett Packard, pp. 1-10, Jun. 2000.
Krister Lagerström, "Design and Implementation of an MPEG-1 Layer III Audio Decoder," Design and Implementation of an MP3 Decoder, pp. 1-44, May 2001.

* cited by examiner

*Primary Examiner*—Chuong D. Ngo
(74) *Attorney, Agent, or Firm*—Oliff & Berridge, PLC

(57) ABSTRACT

To decrease the number of arithmetical operations in a filtering process for decoding a digital signal and reduce a cost required for decoding. A filtering method for use in decoding a digital signal from a frequency domain to a time domain includes: a first step of multiplying an input data stream and a transformation matrix that is decomposed into a sparse matrix from an inverse MDCT transformation matrix for making the inverse MDCT transformation of the input data stream composed of a plurality of data blocks, and has a smaller size than the inverse MDCT transformation matrix, to acquire an output data stream composed of a plurality of data blocks; a second step of storing predetermined data contained in each data block of the output data stream; and a third step of generating the digital signal in the time domain on the basis of each data block acquired at the first step and the predetermined data stored at the second step in processing the former stage data block.

6 Claims, 15 Drawing Sheets

| | previous window | current window |
|---|---|---|
| WHEN FORMER STAGE BLOCK DATA IS PROCESSED THROUGH LONG WINDOW |  w6  w11  1  short |  w0  w11  short window |
| WHEN FORMER STAGE BLOCK DATA IS PROCESSED THROUGH SHORT WINDOW |  w6  w11  1  short |  w0  w11  short window |

| | previous window | current window |
|---|---|---|
| WHEN FORMER STAGE BLOCK DATA IS PROCESSED THROUGH LONG WINDOW |  w18    w35<br>normal window |  w0    w17<br>normal window |
| WHEN FORMER STAGE BLOCK DATA IS PROCESSED THROUGH SHORT WINDOW |  w6  w11<br>1 \| short \| 0 |  w0  w5<br>0 \| short \| 1 |

| KIND OF WINDOW MULTIPLIED | SHAPE OF WINDOW |
|---|---|
| NORMAL WINDOW |  |
| START WINDOW |  |
| STOP WINDOW |  |

FILTERING METHOD AND APPARATUS

BACKGROUND OF THE INVENTION

1. Field of the Invention

The present invention relates to a filtering method and apparatus for use in decoding the digital signal from the frequency domain to the time domain.

2. Description of the Prior Art

Conventionally, a method for decoding the digital signal in the MP3 (MPEG Audio Layer III) or the like from the frequency domain to the time domain was well known that employed the filtering with a hybrid filter bank.

FIG. 9 is a diagram showing the configuration of functions of an encoder 100 and a decoder 200 in accordance with the MP3 standards. The main functions of the encoder 100 and the decoder 200 will be set forth below with reference to FIG. 9.

In FIG. 9, the encoder 100 comprises a hybrid filter bank (hereinafter referred to as an "HFB") 110, a psychoacoustic analysis portion 120, an iteration loop 130, a Huffman coding portion 140, a side information coding portion 150, and a stream composing portion 160.

The HFB 110 further comprises a sub-band analysis filter bank 111, an adaptive block length MDCT (Modified Discrete Cosine Transform) 112, and an alias reduction butterfly 113.

The sub-band analysis filter bank 111 cuts out an audio signal input into the encoder 100 by a predetermined window among the windows as shown in FIG. 10, and divides the audio signal from the time domain into a plurality of frequency domains. The adaptive block length MDCT 112 transforms each of these signals into more subdivided frequency spectrum in accordance with a predetermined transformation expression. The alias reduction butterfly 113 makes a predetermined butterfly operation on these frequency spectrum for output to the iteration loop 130. The adaptive block length MDCT 112 makes a transformation process into the frequency spectrum in accordance with weighting of the data based on the analysis result of the psychoacoustic analysis portion 120 (i.e., a bit allocation based on a psychoacoustic model).

The iteration loop 130 makes the non-linear quantization of the input frequency spectrum in accordance with weighting of the data based on the analysis result of the psychoacoustic analysis portion 120. Also, the iteration loop 130 calculates a scale factor (the information regarding the weighting of the data based on the analysis result of the psychoacoustic analysis portion 120) from an output signal (frequency spectrum) of the HFB 110, and outputs it to the side information coding portion 150.

The Huffman coding portion 140 makes the Huffman coding of a signal quantized by the iteration loop 130.

The side information coding portion 150 encodes the side information, including the information regarding the window employed in the adaptive block length MDCT 112, the scale factor of frequency spectrum, and the information regarding a Huffman table used for decoding.

The stream composing portion 160 composes a stream of signals output from the Huffman coding portion 140 and the side information coding portion 150, with CRC (Cyclic Redundancy Check) added, and outputs it to the communication channel or the like.

On the other hand, the decoder 200 comprises a stream decomposing portion 210, a scale factor decoding portion 220, a Huffman table decoding portion 230, a Huffman decoding portion 240, an inverse quantization portion 250, and a hybrid filter bank 260.

The stream decomposing portion 210 decomposes the stream data received from the communication channel into frames.

The scale factor decoding portion 220 decodes a frame regarding the scale factor among the data divided by the stream decomposing portion 210, and outputs the decoded frame to the inverse quantization portion 250.

The Huffman table decoding portion 230 decodes a frame regarding the Huffman table among the data divided by the stream decomposing portion 210, and outputs the decoded frame to the Huffman decoding portion 240.

The Huffman decoding portion 240 makes the Huffman coding of a frame regarding the frequency spectrum of audio signals among the frames decomposed by the reception processing portion 210 on the basis of the information regarding the Huffman table input from the Huffman table decoding portion 230, and outputs the decoded data (Huffman decoded data) to the inverse quantization portion 250.

The inverse quantization portion 250 makes the inverse quantization of the Huffman decoded data on the basis of the scale factor input from the scale factor decoding portion 220 and the Huffman decoded data input from the Huffman decoding portion 240, and outputs the dequantized data to the hybrid filter bank (HFB) 260.

The HFB 260 further comprises an alias reduction butterfly 261, an inverse MDCT 262, and a sub-band synthesis filter bank 263.

The alias reduction butterfly 261 makes a predetermined butterfly operation on the dequantized data input from the inverse quantization portion 250, and outputs the operation result to the inverse MDCT 262.

The inverse MDCT 262 that comprises an inverse MDCT buffer 262a (see FIGS. 12 and 14 as hereinafter described) for use in the processing makes the inverse MDCT of the operation result input from the alias reduction butterfly 261 in accordance with a predetermined transformation expression, and outputs the processed result to the sub-band synthesis filter bank. The inverse MDCT 262 makes a processing corresponding to each of the windows, including a long window and a short window or the like, on the basis of the information regarding the window contained in the side information.

The sub-band synthesis filter bank 263 that comprises a sub-band synthesis buffer 263a makes the sub-band synthesis of the processed result input from the inverse MDCT 262 to be output as an audio signal in the time domain.

Now, the processing in the sub-band synthesis filter bank 263 and the inverse MDCT 262 will be set forth.

The sub-band synthesis filter bank 263 performs an arithmetical operation for an input data stream S in accordance with the following expression:

$$V(i) = \sum_{k=0}^{31} S(k)\cos[\pi/64(i+16)(2k+1)] \quad (0 \le i \le 63) \quad (1)$$

Expression (1) can be represented in terms of a determinant in the following manner.

$$V = P_{64 \times 32} S \quad (2)$$

The sub-band synthesis filter bank 263 calculates an output data stream V (PCM sample data) composed of 32 data blocks from the input data stream S in accordance with the expression (2). At this time, the sub-band synthesis filter bank 263 performs the multiplication by 64×32=2048 times and the addition by 64×31=1984 times.

The input data stream S as above mentioned is the data rearranged at an output signal of the inverse MDCT 262. Namely, one time sample is extracted from each of 32 data blocks contained in the output signal of the inverse MDCT 262, and the extracted data of 32 samples (sample data in the frequency domain) are rearranged to generate the data block in a unit of 32 PCM (Pulse Coded Modulation) samples (sample data in the time domain). This processing is made for all the output signals from the inverse MDCT 262, so that the input data stream S composed of 18 data blocks can be obtained.

Referring now to FIG. 11, a processing in the sub-band synthesis filter bank 263 (i.e., a sub-band synthesis processing) employing the above transformation expression will be described below.

FIG. 11 is a diagram showing a processing procedure in the case where the sub-band synthesis filter bank 263 processes the input data stream S.

In FIG. 11, the sub-band synthesis buffer 263a stores 16 data blocks S0-0 to S0-15 calculated from the input data stream S at the former stage in accordance with the expression (2), each data block being composed of 64 pieces of data.

At first, the sub-band synthesis filter bank 263 shifts the data blocks S0-0 to S0-15 to the right by 64 (one data block) (step S1). Then, the sub-band synthesis filter bank 263 makes the transformation process for the input data stream S in accordance with the expression (2) (step S2), and stores a calculated data block S1-0 in the sub-band synthesis buffer 263a (step S3).

Then, the sub-band synthesis filter bank 263 extracts one-half (512) pieces of data from the data blocks S1-0 to S1-15 stored in the sub-band synthesis buffer 263a (step S4). And the sub-band synthesis filter bank 263 multiplies the extracted 512 pieces of data by the window (step S5), and periodically adds the calculated 512 pieces of data at a period of 32 to output the data block (PCM sample data) composed of 32 pieces of data (step S6).

Also, the inverse MDCT 262 performs the arithmetical operation on the input data stream X in accordance with the following expression.

$$x(k) = \sum_{j=0}^{N/2-1} x(j)\cos\left[\frac{\pi}{N}(k+1/2+N/4)(j+1/2)\right] (0 \le k \le N-1) \quad (3)$$

where N is equal to 36 (long window) or 12 (short window)

Expression (3) can be represented in terms of a determinant in the following manner.

$$x = P_{N \times N/2} X \quad (4)$$

where $[P_{N \times N/2}]_{k,j} = \cos\left[\frac{\pi}{N}(k+1/2+N/4)(j+1/2)\right]$ The inverse MDCT 262 calculates an output data stream x composed of 32 data blocks from the input data stream X in accordance with the expression (4). At this time, the inverse MDCT 262 performs the multiplication by 36×18=648 times and the addition by 36×17=612 times, when performing the arithmetical operation employing the window of the long window, or performs the multiplication by 12×6=72 times and the addition by 12×5=60 times, when performing the arithmetical operation employing the window of the short window.

Also, the inverse MDCT 262 makes the data processing (i.e., inverse MDCT processing) as shown in FIGS. 12 and 14 in accordance with the kind of window employed for processing.

FIG. 12 is a diagram showing a processing procedure in the case where the inverse MDCT 262 processes the data block having passed through the long window.

In FIG. 12, the input data stream X is composed of 32 data blocks D1-0 to D1-31, each data block being composed of 18 pieces of data. Also, in FIG. 12, the data block D1-n denotes the "n" th data block among the data blocks D1-0 to D1-31. The same notation is appropriately employed below.

At first, the input data stream X is processed through the inverse MDCT for each data block in accordance with the expression (3), and transformed into the data blocks D2-0 to D2-31 composed of 36 pieces of data. In FIG. 12, the arrow indicated within the data block D2-n indicates the data arranging order. The same notation is appropriately employed below.

Then, the data block processed through the inverse MDCT is multiplied by the predetermined window, and transformed into the data blocks D3-0 to D3-31 composed of 36 pieces of data.

FIG. 13 is a diagram showing the shape of the window to be multiplied in the processing of FIG. 12. As shown in FIG. 13, the windows (normal window, start window, stop window) may be appropriately employed in accordance with the data blocks D2-0 to D2-31.

Of the datablocks D3-0 to D3-31, the latter half 18 pieces of data contained in each data block are stored in the inverse MDCT buffer, while the former half 18 pieces of data are added to the latter half 18 pieces of data in the data block at the former stage, and transformed into the data blocks D4-0 to D4-31 composed of 18 pieces of data.

FIG. 14 is a diagram showing a processing procedure in the case where the inverse MDCT 262 processes the data block having passed through the short window.

In FIG. 14, the input data stream X is composed of 32 data blocks D1-0 to D1-31, each data block being composed of 18 pieces of data, in the same manner as in the long window. However, in the case of the short window, each of the data blocks D1-0 to D1-31 is delimited into three sets at every six pieces of data processed in the same short window, when encoded, each set of delimited data being subjected to the inverse MDCT processing, and multiplied by the window.

FIG. 15 is a diagram showing the shape of the window to be multiplied in the processing of FIG. 14. As shown in FIG. 15, the window multiplied in the processing of FIG. 14 is the short window, and has the shape as shown in FIG. 15.

And each of the data blocks D5-0 to D5-31 composed of three sets of delimited data calculated in this manner is overlapped with and added to the data block at the former stage, as shown in FIG. 14, and transformed into the data blocks D6-0 to D6-31. Moreover, the latter half 12 pieces of data contained in the data blocks D6-0 to D6-31 are stored in the inverse MDCT buffer, and employed for processing the data block at the latter stage.

SUMMARY OF THE INVENTION

However, in the conventional decoder, the percentage of the computational complexity of the hybrid filter bank to the computational complexity of the entire decoder reaches about 70 percent. Namely, in the decoder, the percentage of the computational complexity is greater in the sub-band synthesis processing and the inverse MDCT processing or the like as shown in FIGS. 11, 12 and 14. In such processing, the sub-band synthesis buffer 263a needs the amount of data of 64×16=1024 blocks, and the inverse MDCT buffer needs the amount of data of 18×32=576 blocks, causing the cost of the entire decoder to be increased.

It is an object of the present invention to provide a filtering method and apparatus in which the number of arithmetical operations required in the filtering process in decoding the digital signal and the cost of decoding is reduced.

In order to accomplish the above object, according to the present disclosure, there is provided a filtering method for use in decoding a digital signal from the frequency domain to the time domain, including: a first step of multiplying an input data stream and a transformation matrix that is decomposed into a sparse matrix from an inverse MDCT transformation matrix (e.g., a transformation matrix $P_{N \times N/2}$ in the expression (4)) for making the inverse MDCT transformation of the input data stream composed of a plurality of data blocks, and has a smaller size than the inverse MDCT transformation matrix, to acquire an output data stream composed of a plurality of data blocks; a second step of storing predetermined data (e.g., a "former stage block data" as described in Detailed Description of the Invention) contained in each data block of the output data stream; and a third step of generating the digital signal in the time domain on the basis of each data block acquired at the first step and the predetermined data stored at the second step of processing the former stage data block.

According to another aspect of the present disclosure, there is provided a filtering apparatus for decoding a digital signal from the frequency domain to the time domain, comprising transformation means for multiplying an input data stream and a transformation matrix that is decomposed into a sparse matrix from an inverse MDCT transformation matrix for making the inverse MDCT of the input data stream composed of a plurality of data blocks and has a smaller size than the inverse MDCT transformation matrix, to acquire an output data stream composed of a plurality of data blocks, memory means for storing predetermined data contained in each data block of the output data stream (e.g., an inverse MDCT buffer 12a as shown in FIGS. 4 and 6), and digital signal output means for outputting the digital signal in the time domain on the basis of each data block contained in the output data stream and the data of a data block at the former stage stored in the memory means.

In another aspect, the first step further comprises a fourth step of making the DCT (Discrete Cosine Transform)-IV transformation process (e.g., transformation process in accordance with the expression (5)) for each data block of the input data stream, the second step further comprises a fifth step of storing a part of the processed result of each data block at the fourth step (e.g., a "former stage block data" as described in Detailed Description of the Invention) that is used in processing the data block at the latter stage, and the third step further comprises a sixth step of folding back and expanding a part of the processed result of each data block at the fourth step other than stored at the fifth step and multiplying the expanded data by a predetermined window to acquire a first processed result, and folding back and expanding a part of the data block at the former stage that is stored at the fifth step, and multiplying the expanded data by a predetermined window to acquire a second processed result, and a seventh step of adding the first and second processed results acquired at the sixth step.

In yet another aspect, the transformation means makes the DCT (Discrete Cosine Transform)-IV transformation process for each data block of the input data stream, the memory means stores a part of the processed result of each data block through the DCT-IV transformation process that is used in processing the data block at the latter stage, and the digital signal output means further comprises: multiplication means for folding back and expanding a part of the processed result of each data block processed through the DCT-IV transformation process other than stored in the memory means, and multiplying the expanded data by a predetermined window to output a first processed result, and folding back and expanding a part of the data block at the former stage that is stored in the memory means, and multiplying the expanded data by a predetermined window to output a second processed result, and addition means for adding the first and second processed results output by the multiplication means.

In another aspect, in the third step, the processing method for generating the digital signal in the time domain is switched on the basis of the side information including the information regarding the decoding of the data block.

In another aspect, the digital signal output means switches the processing method for generating the digital signal in the time domain on the basis of the side information including the information regarding the decoding of the data block.

In another aspect, at the sixth step, the window by which each data block is multiplied is switched on the basis of the side information including the information regarding the decoding of the data block.

In another aspect, the multiplication means switches the window by which each data block is multiplied on the basis of the side information including the information regarding decoding the data block.

In another aspect, at the first step, the output data stream is acquired by making the matrixing on each data block of the input data stream in accordance with the following expression:

$$y = C_N^{IV} x$$

where x is a column vector of one data block contained in the input data stream, y is a column vector of output data block corresponding to x, and $C_N^{IV}$ is a DCT-IV transformation matrix represented by the following expression:

$$[C_N^{IV}]_{m,n} = \cos\left[\frac{\left(m+\frac{1}{2}\right)\left(n+\frac{1}{2}\right)\pi}{N}\right], 0 \leq m, n \leq N-1$$

where N is the number of data contained in x.

In another aspect, the transformation means acquires the output data stream by making the matrixing on each data block of the input data stream in accordance with the following expression:

$$y = C_N^{IV} x$$

where x is a column vector of one data block contained in the input data stream, y is a column vector of output data block corresponding to x, and $C_N^{IV}$ is a DCT-IV transformation matrix represented by the following expression:

$$[C_N^{IV}]_{m,n} = \cos\left[\frac{\left(m+\frac{1}{2}\right)\left(n+\frac{1}{2}\right)\pi}{N}\right], 0 \le m, n \le N-1$$

where N is the number of data contained in x.

In another aspect, the present disclosure relates to a filtering method for use in decoding a digital signal from the frequency domain to the time domain, comprising a first step of multiplying an input data stream and a transformation matrix that is decomposed into a sparse matrix from a sub-band synthesis transformation matrix for making the sub-band synthesis of the input data stream composed of a plurality of data blocks and has a smaller size than the sub-band synthesis transformation matrix, to acquire an output data stream composed of a plurality of data blocks (e.g., step S200 in FIG. 8), a second step of shifting each data block of the output data stream calculated and stored beforehand by one data block, every time each data block of the output data stream is calculated (e.g., step S100 in FIG. 8), a third step of storing the calculated data block (e.g., step S300 in FIG. 8), and a fourth step of generating the digital signal in the time domain on the basis of the stored data (e.g., step S400 to step S600 in FIG. 8).

In another aspect, the present disclosure relates to a filtering apparatus for decoding a digital signal from the frequency domain to the time domain, comprising transformation means for multiplying an input data stream and a transformation matrix that is decomposed into a sparse matrix from a sub-band synthesis transformation matrix for making the sub-band synthesis of the input data stream composed of a plurality of data blocks and has a smaller size than the sub-band synthesis transformation matrix, to acquire an output data stream composed of a plurality of data blocks, memory means for storing the calculated data blocks (e.g., the sub-band synthesis buffer 13a in FIG. 8), memory control means for shifting each data block stored in the memory means by one data block, every time each data block of the output data stream is calculated and storing the calculated data block in the memory means, and digital signal output means for outputting the digital signal in the time domain on the basis of the data stored in the memory means.

In another aspect, the first step further comprises a fifth step of making the DCT (Discrete Cosine Transform)-II transformation process for each data block of the input data stream, the fourth step further comprises a sixth step of folding back and expanding the predetermined data of the stored data block and multiplying th expanded data by a predetermined window to acquire a data stream composed of a plurality of data blocks (e.g., step S400 and step S500 in FIG. 8), and a seventh step of adding the data contained in the data stream calculated at the sixth step at a predetermined period (e.g., step S600 in FIG. 8).

In another aspect, the transformation means makes the DCT (Discrete Cosine Transform)-II transformation process for each data block of the input data stream, and the digital signal output means further comprises multiplication means for folding back and expanding a predetermined data of the data block stored in the memory means, and multiplying the expanded data by a predetermined window, to acquire a data stream composed of a plurality of data blocks, and addition means for adding the data contained in the data stream that are calculated by the multiplication means at a predetermined period.

In another aspect, in the first step, the output data stream is acquired by making the matrixing on each data block of the input data stream in accordance with the following expression:

$$y = C_N^{II} x$$

where x is a column vector of one data block contained in the input data stream, y is a column vector of output data block corresponding to x, and $C_N^{II}$ is a DCT-II transformation matrix represented by the following expression, $$[C_N^{II}]_{m,n} = \cos\left[\frac{m(2n+1)\pi}{2N}\right], 0 \le m, n \le N-1$$

where N is the number of data contained in x.

In another aspect, the transformation means acquires the output data stream making the matrixing on each data block of the input data stream in accordance with the following expression:

$$y = C_N^{II} x$$

where x is a column vector of one data block contained in the input data stream, y is a column vector of output data block corresponding to x, and $C_N^{II}$ is a DCT-II transformation matrix represented by the following expression:

$$[C_N^{II}]_{m,n} = \cos\left[\frac{m(2n+1)\pi}{2N}\right], 0 \le m, n \le N-1$$

where N is the number of data contained in x.

In each of these aspects, in decoding the digital signal from the frequency domain to the time domain, the number of arithmetical operations performed in the filtering and the memory capacity of data required for the operation can be reduced. Therefore, the decoding can be performed more rapidly, and the cost required for decoding reduced. Further, the power consumption required for the decoding process can be saved.

Also, in the decoding process, a suitable decoding method can be chosen in accordance with each input data stream.

Also, even when the coded data through various windows is mingled in the input data stream, a decoding process can be appropriately performed.

DETAILED DESCRIPTION OF THE PREFERRED EMBODIMENTS

The preferred embodiments of a hybrid filter bank 10 according to the present invention will be described below with reference to the drawings.

FIGS. 1 to 8 are diagrams showing the hybrid filter bank (hereinafter referred to as an "HFB") 10 to which the invention is applied.

The hybrid filter bank 10 according to the invention is provided in a digital signal decoder such as an MP3 decoder, to transform a signal from the frequency domain to the time domain.

Firstly, the configuration of the hybrid filter bank 10 will be set forth.

Figure 1:
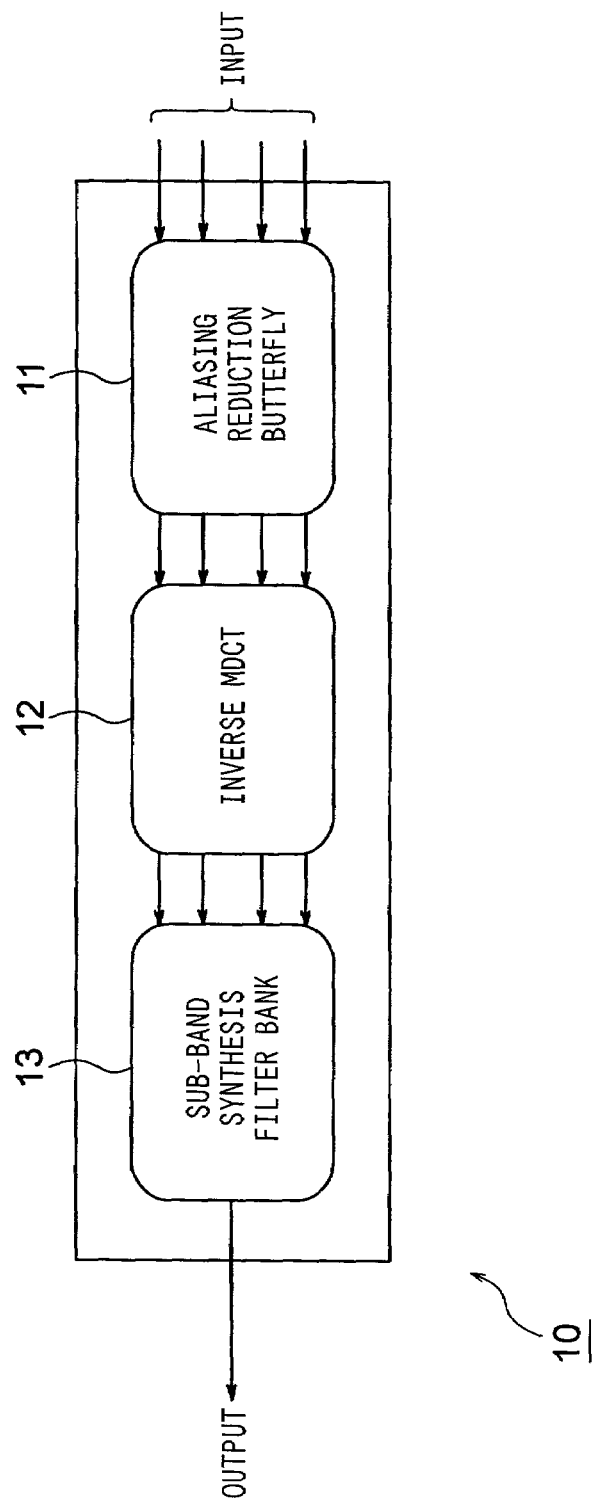
FIG. 1 is a diagram showing the configuration of a hybrid filter bank 10 according to the present invention.

FIG. 1 is a diagram showing the configuration of the hybrid filter bank 10 to which the invention is applied.

In FIG. 1, the HFB 10 comprises an alias reduction butterfly 11, an inverse MDCT 12, and a sub-band synthesis filter bank 13. The configuration of the alias reduction butterfly 11 is the same as that of the conventional HFB 260, and the explanation thereof is omitted here.

The inverse MDCT 12 comprises an inverse MDCT buffer 12a used in the processing (see FIG. 4 or 6 as will be described later). And the inverse MDCT 12 makes an inverse MDCT in accordance with a predetermined transformation expression, multiplication of a window, and an overlap addition or the like for an operation result (a signal in the frequency domain that is MDCT transformed) input from the alias reduction butterfly 11, and outputs a processed result to the sub-band synthesis filter bank 13. The inverse MDCT 12 makes a processing corresponding to the window for a long window or short window on the basis of the information regarding the window contained in the side information.

Herein, the processing in the inverse MDCT 12 will be now set forth.

The inverse MDCT 12 multiplies an input data stream X that is the operation result of the alias reduction butterfly 11 by a transformation matrix as follows.

$$P_{N \times N/2} = \begin{bmatrix} I_{N/4} & 0 \\ -J_{N/4} & 0 \\ 0 & -J_{N/4} \\ 0 & -I_{N/4} \end{bmatrix} \begin{bmatrix} 0 & I_{N/4} \\ I_{N/4} & 0 \end{bmatrix} C_{N/2}^{IV} \quad (5)$$

where $[C_N^{IV}]_{k,j} = \cos\left[\frac{\pi}{N}(k+1/2)(j+1/2)\right]$

Expression (5) is derived by decomposing the inverse MDCT transformation matrix $P_{N \times N/2}$ in the expression (4) into sparse matrix. In the expression (5), $I_{N/4}$ is a unit matrix of N/4×N/4, $J_{N/4}$ is an inversion matrix of N/4×N/4, $C^{IV}$ is a DCT-IV transformation matrix, and "0" is a zero matrix.

Figure 2:
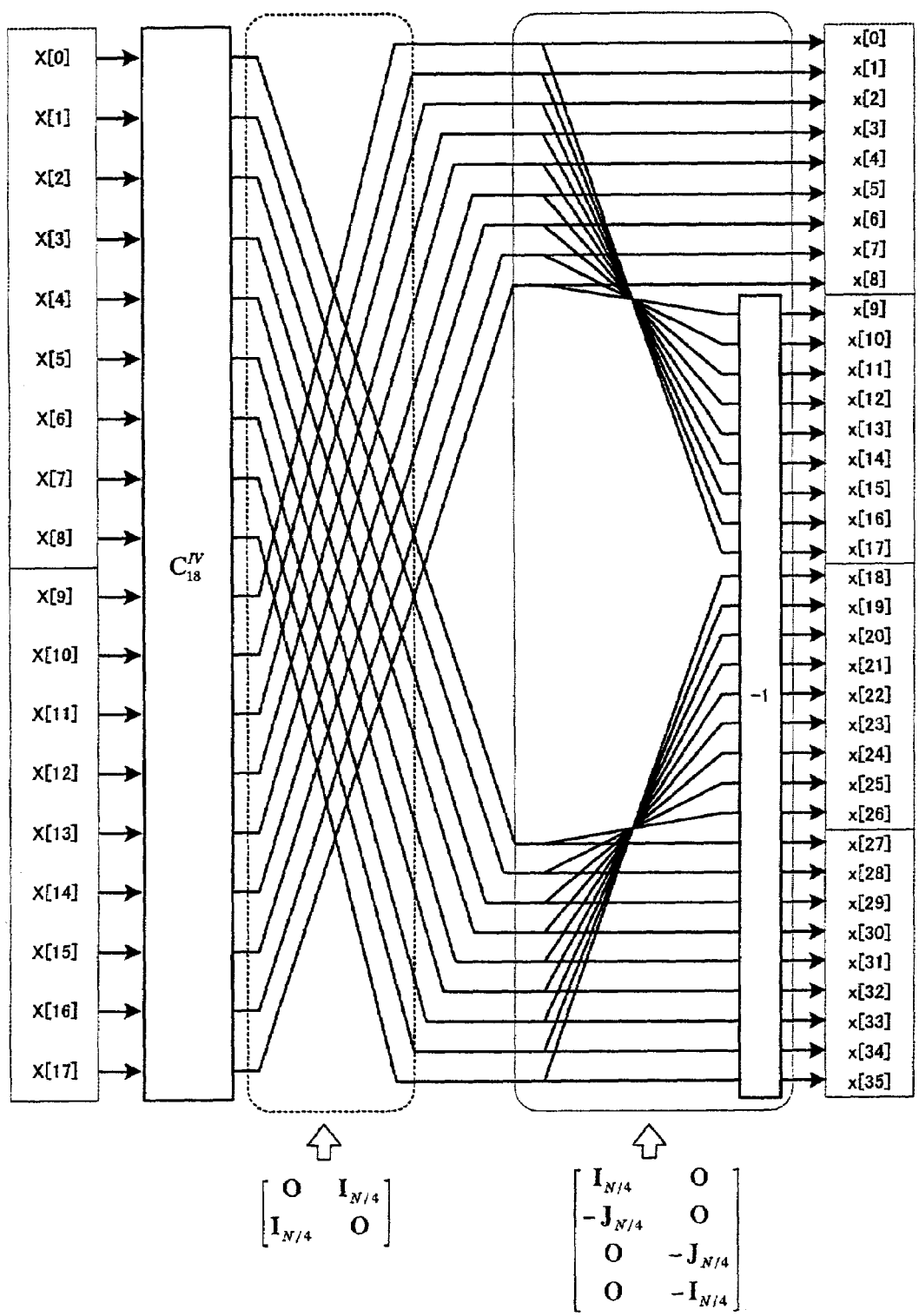
FIG. 2 is a diagram showing the process of a matrixing in expression (5)

FIG. 2 is a diagram showing an operation process of matrix calculation in the expression (5). As shown in FIG. 2, the first and second matrices on the right hand in the expression (5) consist of unit matrixes, inversion matrixes, and zero matrixes, and simply involve replacing and distributing the data. Namely, in the expression (5), the processing with the DCT-IV transformation matrix $C^{IV}$ only involves multiplication and addition in practice.

Accordingly, in the case where the inverse MDCT transformation is performed in accordance with the expression (5), the number of operations is halved as compared with the conventional method of making the inverse MDCT transformation in accordance with the expression (4). For example, in a case where the calculation process is performed employing a window of long window, the multiplication is performed by 18×18=324 times, and the addition is performed by 18×17=306 times. In a case where the calculation process is performed employing a window of short window, the multiplication is performed by 6×6=36 times, and the addition is performed by 6×5=30 times.

The inverse MDCT 12 makes the inverse MDCT for 36 points, thereby generating 36 pieces of data from the data block composed of 18 pieces of data obtained by the DCT-IV transformation. At this time, the latter half 9 pieces of data among 18 pieces of data obtained by the DCT-IV transformation are folded back to have 18 pieces of data, which are then directly employed for the processing with the data block at the former stage. The former half 9 pieces of data are folded back to have 18 pieces of data, which are then employed for the processing with the data block at the latter stage. Accordingly, in processing the data block at the latter stage, it is required to hold 18 pieces of data generated by folding back the former half 9 pieces of data. Herein, instead of storing the 18 pieces of data, the former half 9 pieces of data in the data block composed of 18 pieces of data obtained through the DCT-IV transformation are stored in the inverse MDCT buffer 12a. Therefore, the amount of data stored up to processing the data block at the latter stage is reduced by half, and the memory capacity is decreased.

The sub-band synthesis filter bank 13 comprises a sub-band synthesis buffer 13a. The sub-band synthesis buffer 13a makes the sub-band synthesis processing for the processed result input from the inverse MDCT 12, and consequently outputs a digital signal (output data stream V) in the time domain.

Herein, the processing in the sub-band synthesis filter bank 13 will be set forth.

The sub-band synthesis filter bank 13 multiplies an input data stream S that is the processed result of the inverse MDCT 12 by a transformation matrix $P_{64 \times 32}$ as follows.

$$P_{64 \times 32} = \begin{bmatrix} 0 & I_{16} \\ & -L_{32} \\ I_{16} & 0 \end{bmatrix} C^{II}_{32} \quad (6)$$

Where $L_{32} = \begin{bmatrix} 0 & 0 \\ 0 & J_{31} \end{bmatrix}$, $[C^{II}_{32}]_{i,k} = \cos[\frac{\pi}{64} i(2k+1)]$ Expression (6) is derived by decomposing the transformation matrix $P_{64 \times 32}$ in the expression (2) into sparse matrix. In the expression (6), $I_{16}$ is a unit matrix of 16×16, $J_{31}$ is an inversion matrix of 31×31, $C^{II}$ is a DCT-II transformation matrix, and "0" is a zero matrix.

Figure 3:
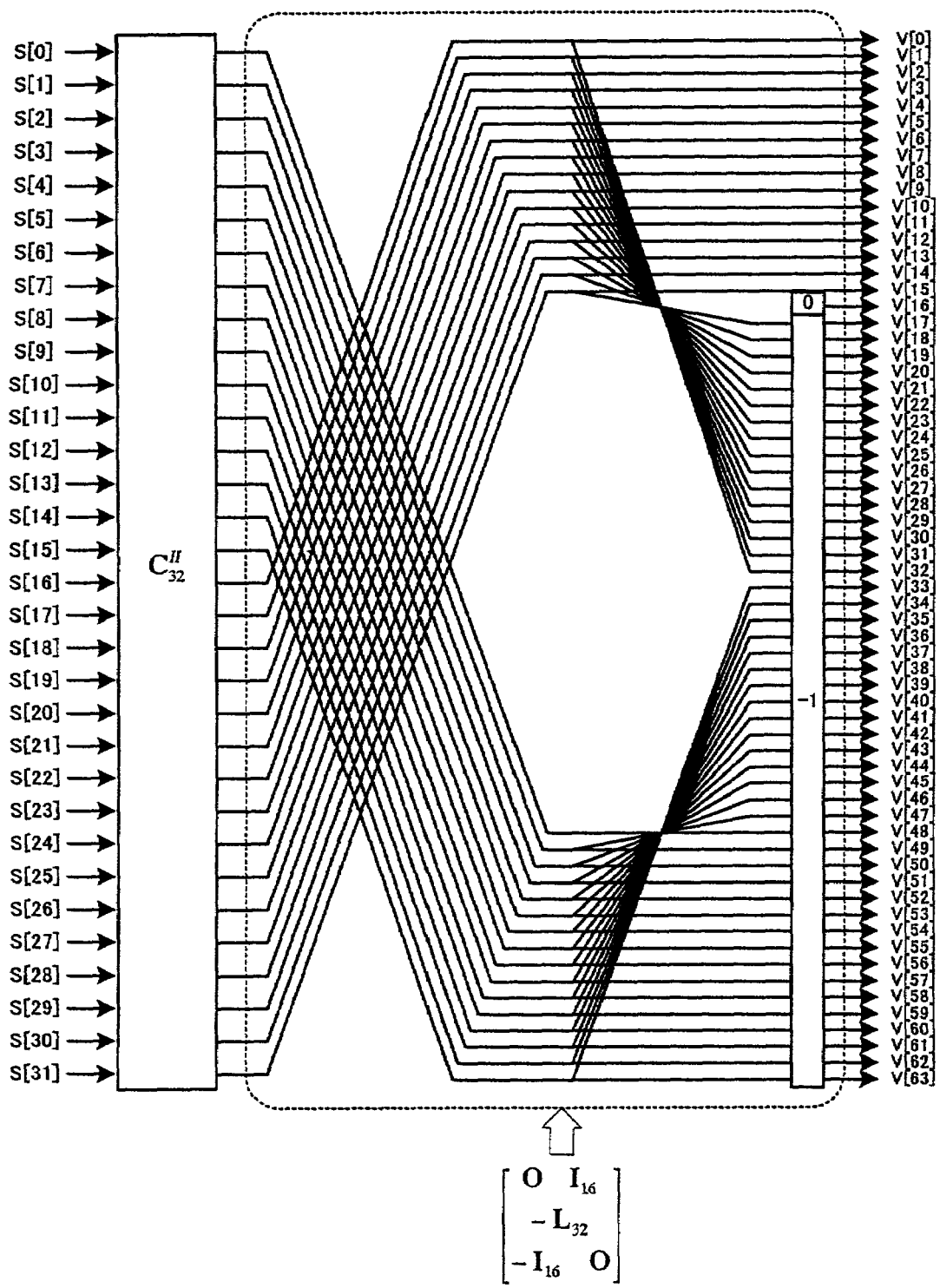
FIG. 3 is a diagram showing the process of a matrixing in expression (6)

FIG. 3 is a diagram showing an operation process of matrix calculation in the expression (6). As shown in FIG. 3, the first matrix on the right hand in the expression (6) consist of unit matrixes, an inversion matrix, and zero matrixes, and simply involve replacing and distributing the data. Namely, in the expression (6), the processing with the DCT-II transformation matrix $C^{II}$ only involves multiplication and addition in practice.

Accordingly, in the case where the sub-band synthesis processing is performed in accordance with the expression (6), the multiplication is performed by 32×32=1024 times, and the addition is performed by 32×31=992 times, whereby the number of operations is halved as compared with the conventional method making the sub-band synthesis processing in accordance with the expression (1).

Moreover, in the sub-band synthesis processing, it is required to hold 64 pieces of data that is the multiplication result of the input data stream by the transformation matrix in the expression (6) to be used in the data block at the latter stage. However, these 64 pieces of data are obtained by replacing and distributing 32 pieces of data obtained by the DCT-II transformation. Accordingly, instead of storing the 64 pieces of data, the 32 pieces of data are stored in the sub-band synthesis buffer 13a, whereby the memory capacity is reduced by half as compared with the conventional method.

The operation will be described below.

First of all, the operation of the inverse MDCT 12 will be set forth.

Figure 4:
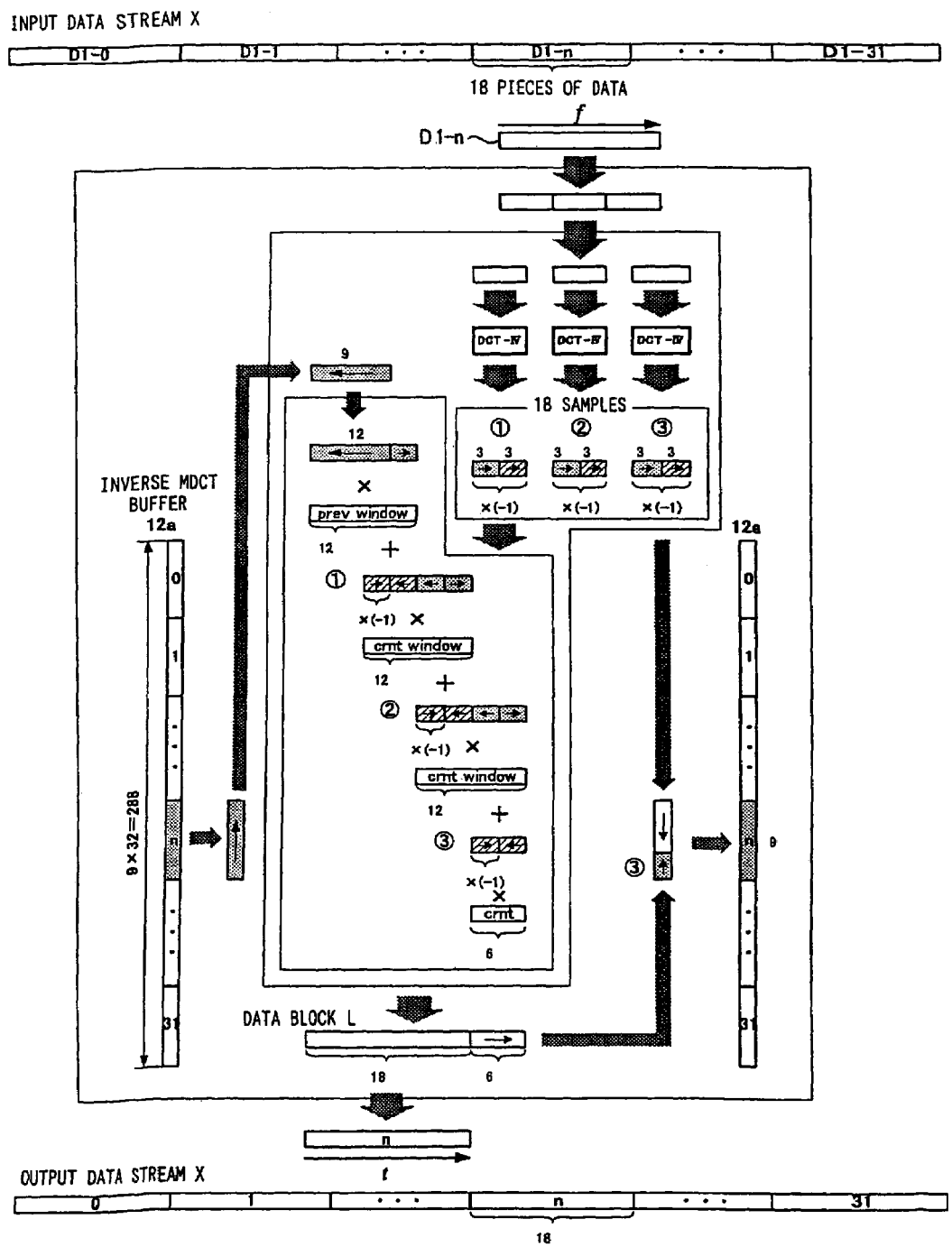
FIG. 4 is a diagram showing a processing procedure in the case where an inverse MDCT 12 processes the data block processed in a short window.

FIG. 4 is a diagram showing a processing procedure for the inverse MDCT 12 to process the data block that has passed through the short window.

In FIG. 4, an input data stream is composed of 32 data blocks D1-0 to D1-31, each data block being composed of 18 pieces of data. Each data block is delimited into three sets for every 6 pieces of data having passed through the same short window, when encoding, and the inverse MDCT transformation (in accordance with the expression (5)) is made for each delimited data (hereinafter referred to as a "short block"). In FIG. 4, the notation "x (−1)" means that each value of data array is multiplied by "−1". The same notation is appropriately employed in the following.

Three short blocks having undergone the inverse MDCT transformation processing (hereinafter referred to as the first to third short blocks in the order of short block array, each designated with ① to ③ in FIG. 4).

Firstly, the entire data in the first and second short blocks and the latter half of data in the third short block (latter three pieces of data) are folded back and expanded into double size.

Also, the 9 pieces of data in the data block at the former stage (hereinafter referred to as a "former stage block data") that are stored in the inverse MDCT buffer 12a, and expanded into four-thirds times (12 pieces of data). These pieces of data are multiplied by respective windows, and the multiplication results are over lapping addition, as shown in FIG. 4. Consequently, the data block L composed of 24 pieces of data is generated.

Herein, the former stage block data is processed by switching the window depending on whether the data is encoded through the long window or the short window and so on.

Figure 5:
FIG. 5 is a diagram showing the shape of a window multiplied in the processing of FIG. 4.
Figure 5:
Figure 5:
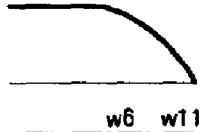
Figure 5:

FIG. 5 is a diagram showing the shape of window that is multiplied in the processing of FIG. 4. As shown in FIG. 5, in the case where the former stage block data is encoded through the long window, the former stage block data is multiplied by the latter half 18 pieces of data in the start window. Since the last 6 pieces of data in the start window are "0", the description is omitted in FIG. 5. Also, in the case where the former stage block data is encoded through the short window, the former stage block data is multiplied by the latter half 6 pieces of data in the short window. Moreover, each short block is multiplied by the short window in either case.

Among the data contained in the generated data block L, the former half 18 pieces of data are output as the operation result of the inverse MDCT 12. On the other hand, the latter half 6 pieces of data contained in the data block L are connected with the latter half 3 pieces of data in the third short block, as above described, and stored at a predetermined address of the inverse MDCT buffer 12a.

Figure 6:
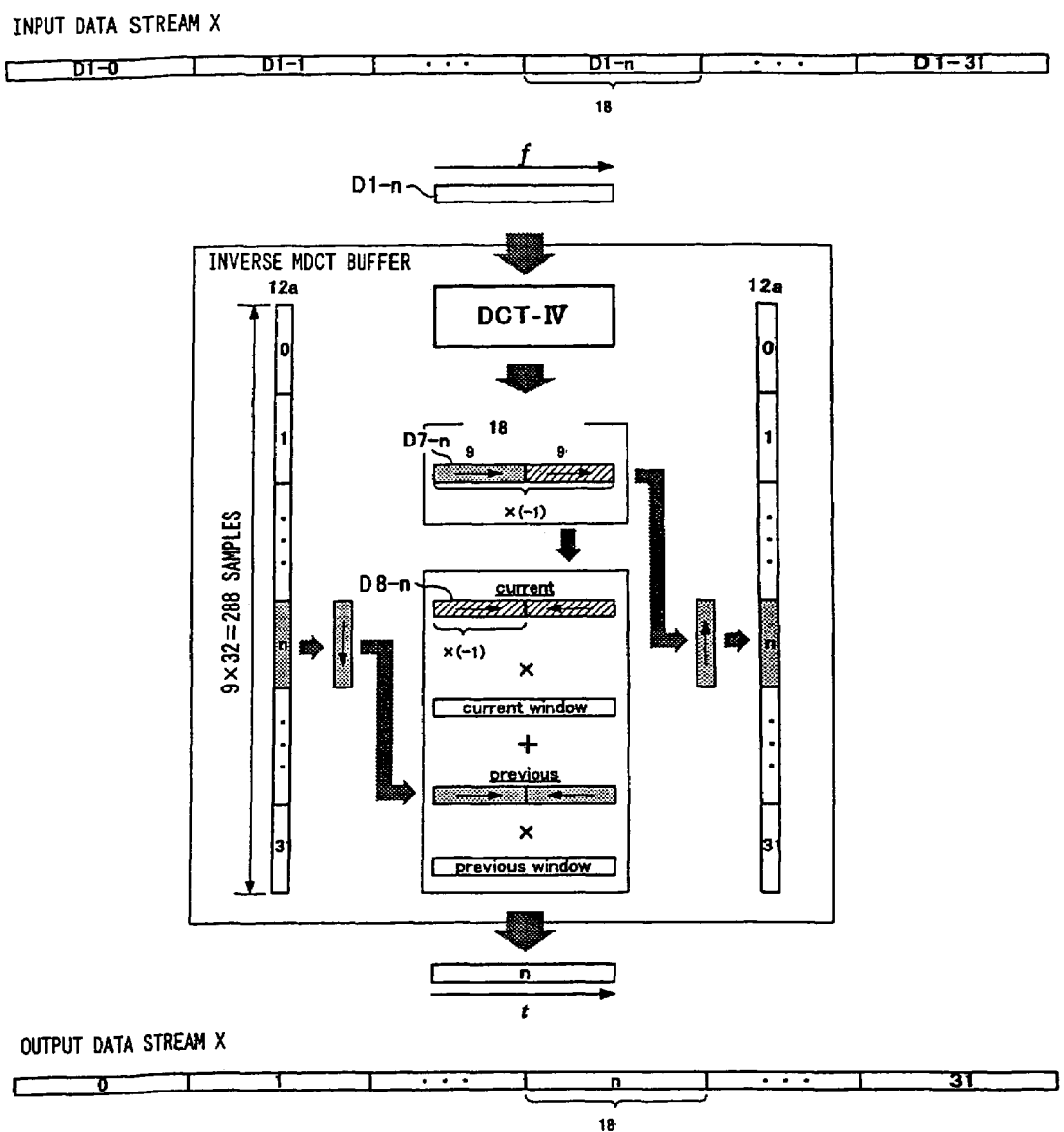
FIG. 6 is a diagram showing a processing procedure in the case where the inverse MDCT 12 processes the data block processed in a long window.

FIG. 6 is a diagram showing a processing procedure for the inverse MDCT 12 to process the data block that has been processed by the long window.

In FIG. 6, an input data stream is composed of 32 data blocks D1-0 to D1-31, each data block being composed of 18 pieces of data.

And the data blocks are subjected to the DCT-IV transformation processing (in accordance with the expression (5)), and transformed into data blocks D7-0 to D7-31.

Next, each of the data blocks D7-0 to D7-31 subjected to the DCT-IV transformation processing is divided into the former half 9 pieces of data and the latter half 9 pieces of data in each data block. The latter half 9 pieces of data are folded back and expanded into double size together with the former stage data block stored in the inverse MDCT buffer 12a, respectively. These pieces of data are multiplied by respective windows, and the multiplication results are over lapping addition, and output as the operation result of the inverse MDCT 12. And the former half 9 pieces of data are stored at the predetermined address of the inverse MDCT 12.

Herein, the former stage data block is processed by switching the window depending on whether the data is encoded through the long window or the short window.

Figure 7:
FIG. 7 is a diagram showing the shape of a window multiplied in the processing of FIG. 6.
Figure 7:
Figure 7:
Figure 7:

FIG. 7 is a diagram showing the shape of window that is multiplied in the processing of FIG. 6. As shown in FIG. 7, in the case where the former stage block data is encoded through the normal window, the former stage block data is multiplied by the latter half 18 pieces of data in the normal window, and the data (referred to as the data blocks D8-0 to D8-31) expanded from the latter half 9 pieces of data in the data blocks D7-0 to D7-31 are multiplied by the former half 18 pieces of data in the normal window. Also, in the case where the former stage block data is encoded through the short window, the former stage block data is multiplied by the latter half 6 pieces of data in the start window, and the data blocks D8-0 to D8-31 are multiplied by the former half 18 pieces of data in the stop window.

As shown in FIGS. 4 and 6, the processed result by the inverse MDCT 12 in which the window is switched in accordance with the processing object data block is multiplied by the transformation matrix of the expression (6) in the sub-band synthesis filter bank 13, and output as a digital signal in the time domain.

The operation of the sub-band synthesis filter bank 13 will be now set forth.

Figure 8:
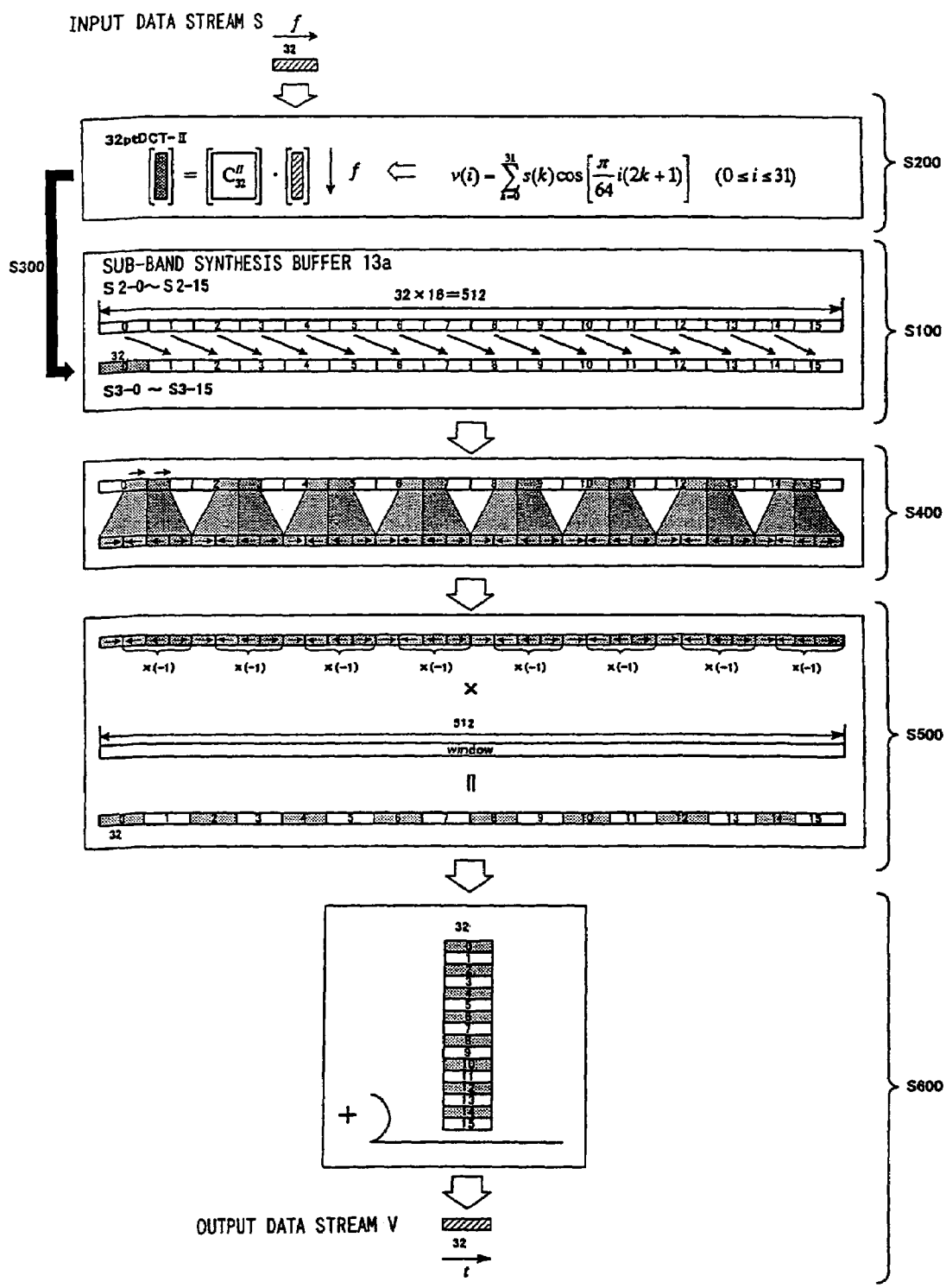
FIG. 8 is a diagram showing a processing procedure in the case where a sub-band synthesis filter bank 13 makes a sub-band synthesis processing.
Figure 9:
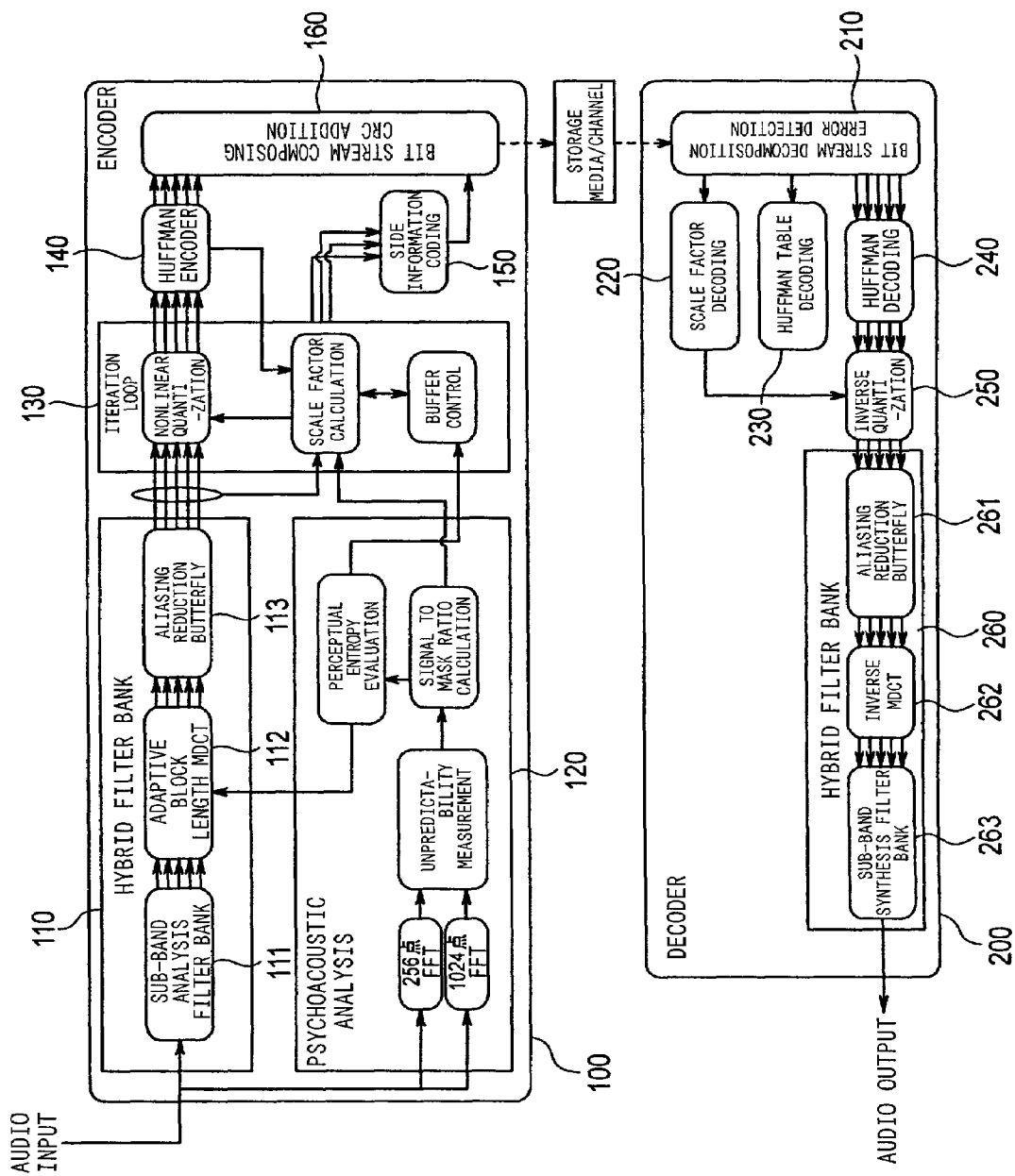
FIG. 9 is a block diagram showing the functional configuration of an encoder 100 and a decoder 200 in accordance with the MP3 standard.
Figure 10:
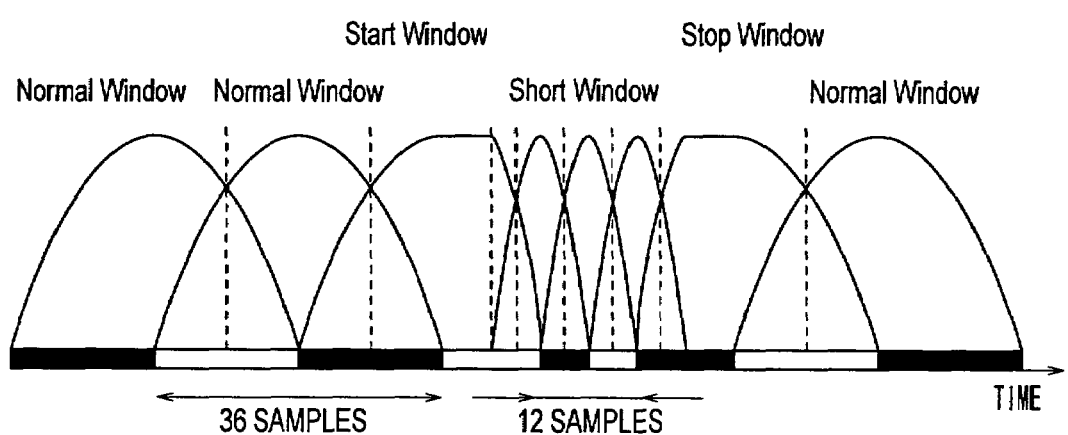
FIG. 10 is a diagram showing a variety of windows for use in the coding and decoding.
Figure 11:
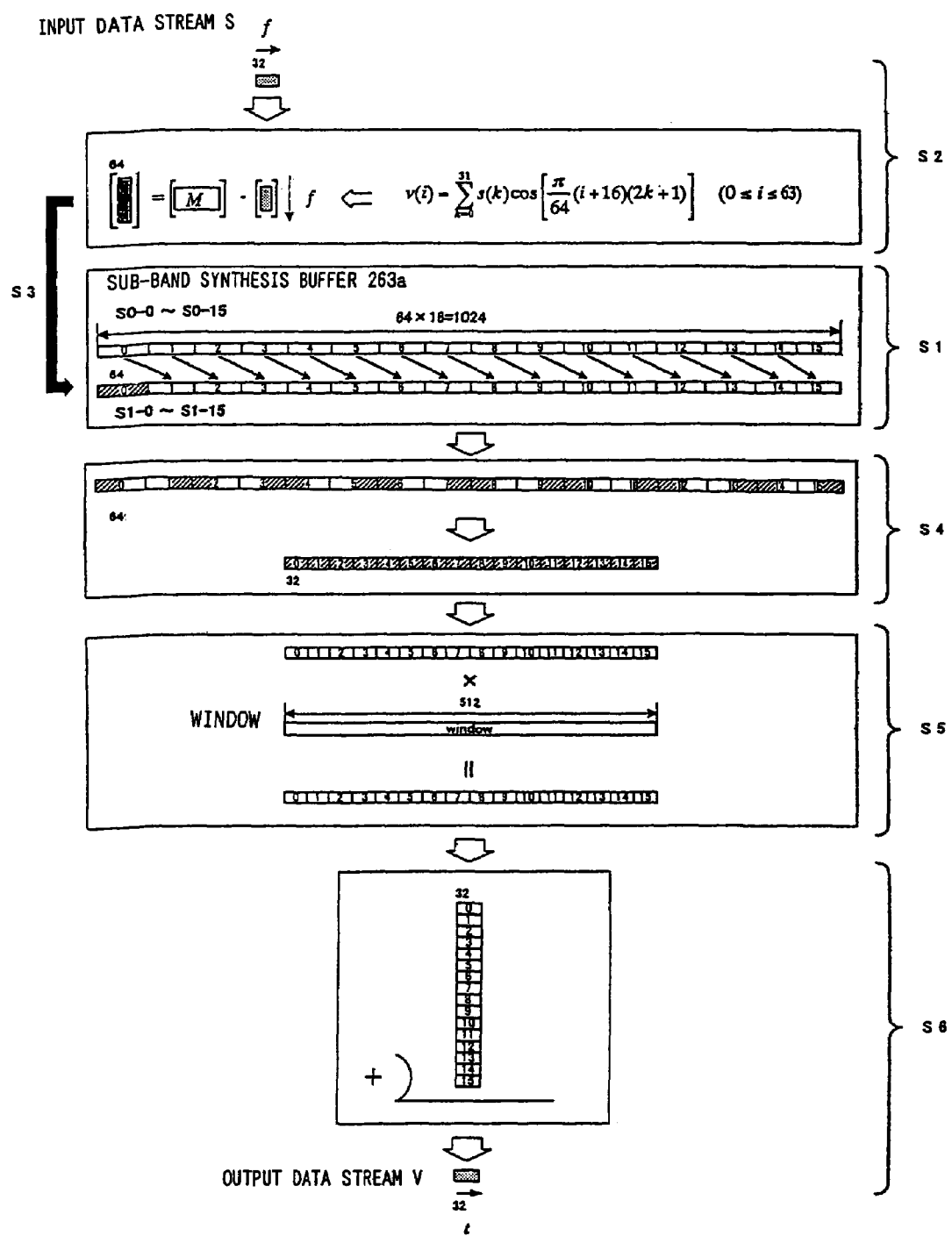
FIG. 11 is a diagram showing a processing procedure in the case where a sub-band synthesis filter bank 263 processes an input data stream S.
Figure 12:
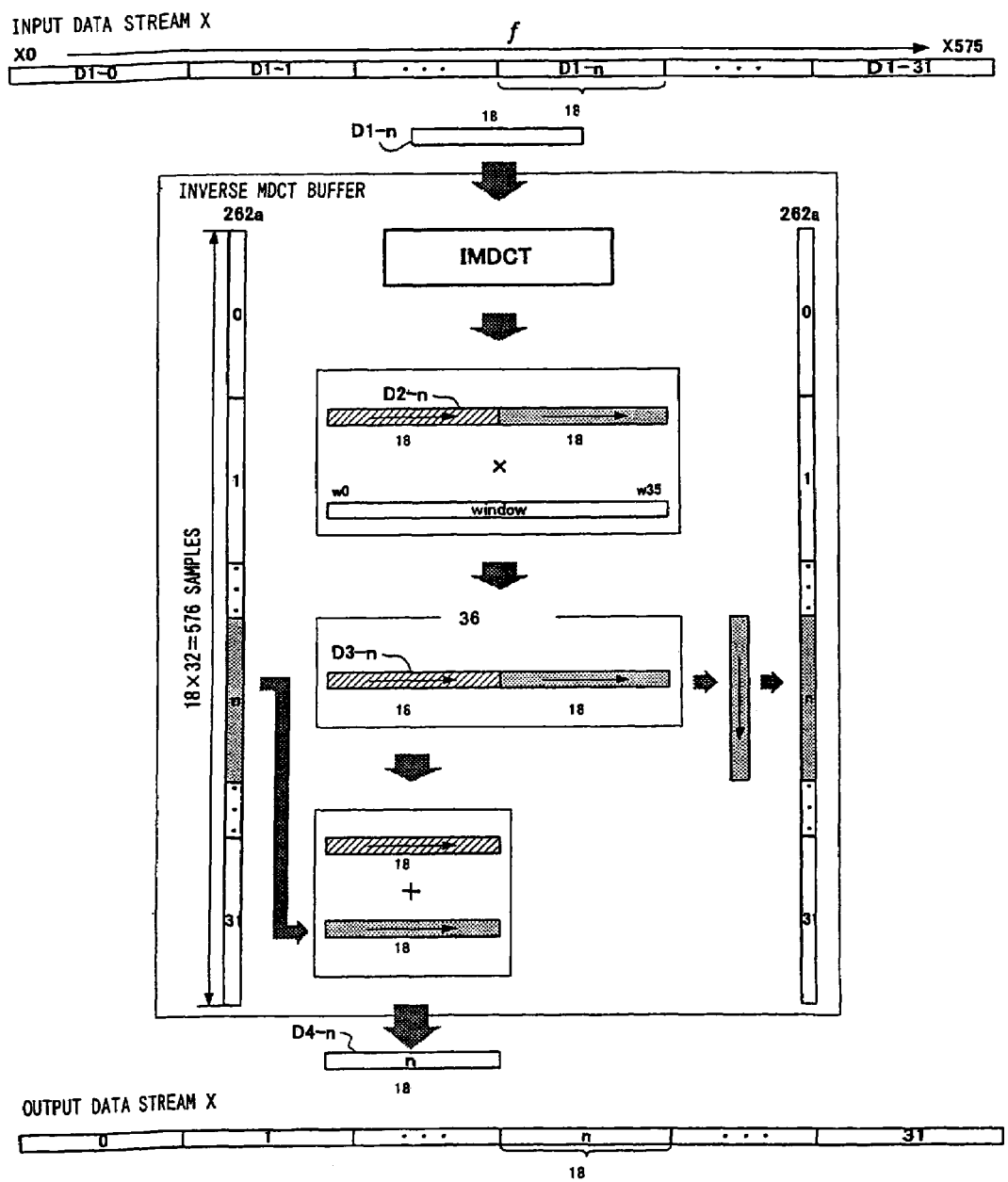
FIG. 12 is a diagram showing a processing procedure in the case where an inverse MDCT 262 processes the data block processed in the long window.
Figure 13:
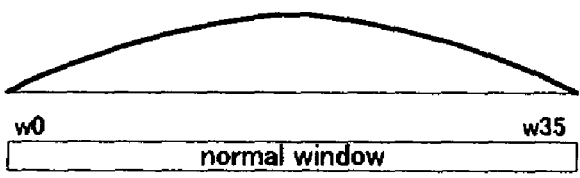
FIG. 13 is a diagram showing the shape of a window multiplied in the processing of FIG. 12.
Figure 13:
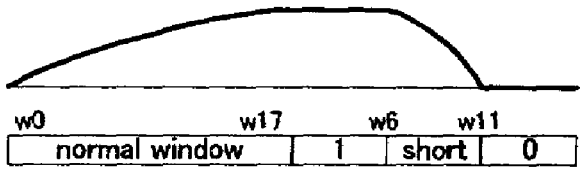
Figure 13:
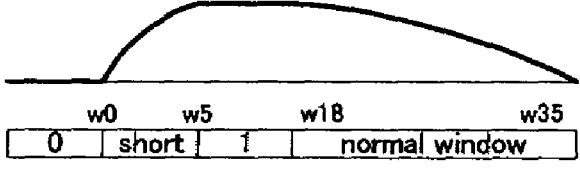
Figure 14:
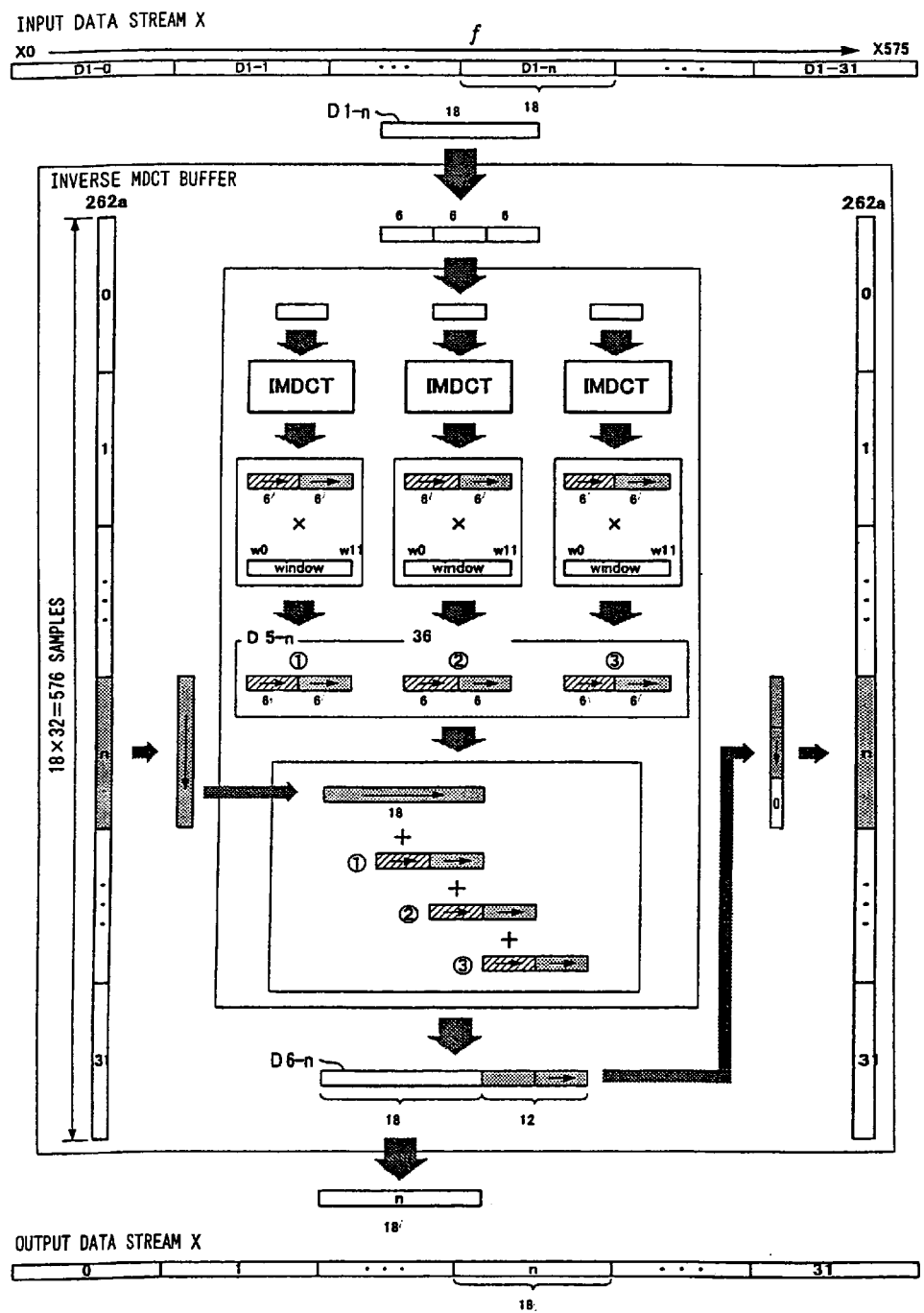
FIG. 14 is a diagram showing a processing procedure in the case where the inverse MDCT 262 processes the data block processed in the short window.
Figure 15:
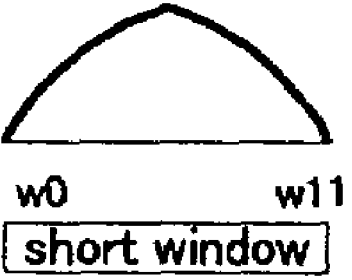
FIG. 15 is a diagram showing the shape of a window multiplied in the processing of FIG. 14.

FIG. 8 is a diagram showing a processing procedure for the sub-band synthesis filter bank 13 to make the sub-band synthesis processing.

In FIG. 8, 16 data blocks S2-0 to S2-15 transformed from the input data stream S at the former stage in accordance with the expression (6) are stored in the sub-band synthesis buffer 13a, each data block being composed of 32 pieces of data.

At first, the sub-band synthesis filter bank 13 shifts the data blocks S2-0 to S2-15 stored in the sub-band synthesis buffer 13a to the right by one data block (step S100).

Also, the sub-band synthesis filter bank 13 makes the 32 point DCT-II transformation process for the input data stream S for each data block to calculate the data block S3-0 successively (step S200). And the sub-band synthesis filter bank 13 stores one calculated data block S3-0 in the sub-band synthesis buffer 13a with the data shifted by one data block (step S300).

Then, the sub-band synthesis filter bank 13 rearranges the 32×16=512 pieces of data stored in the sub-band synthesis buffer 13a in a predetermined order (step S400).

Then, the sub-band synthesis filter bank 13 multiplies the 512 pieces of rearranged data by the window, and outputs 16 data blocks composed of 32 pieces of data (step S500).

Lastly, the sub-band synthesis filter bank 13 adds 16 data blocks periodically, and outputs the data block (PCM sample data) composed of 32 pieces of data (step S600).

The sub-band synthesis filter bank 13 outputs the PCM sample data by repeating step S100 to step S300 successively for every processing of one data block contained in the input data stream.

As described above, with the hybrid filter bank 10 to which this invention is applied, in performing the inverse MDCT process, the inverse MDCT 12 makes the transformation process in accordance with the expression (5).

Accordingly, the number of arithmetical operations made in the inverse MDCT transformation process is reduced by half as compared with the conventional method, resulting in faster processing.

The former stage block data stored in the inverse MDCT transformation process is composed of 9 pieces of data. Accordingly, the memory capacity is reduced by half as compared with the conventional method in which it was composed of 18 pieces of data. Because the memory capacity provided for the hybrid filter bank is halved, the costs can be reduced. Also, when the inverse MDCT transformation process is performed, the power consumption for storing the data can be saved.

Moreover, the sub-band synthesis filter bank 13 performs the transformation process in accordance with the expression (6). Accordingly, the number of arithmetical operations made in the sub-band synthesis process is reduced by half as compared with the conventional method, resulting in the faster processing. Moreover, the memory capacity required in the sub-band synthesis process is reduced by half as compared with the conventional method because the intermediate operation results of sparse matrix decomposition are stored, resulting in a lower cost. Also, when the sub-band synthesis process is performed, the power consumption required for storing the data can be reduced.

The hybrid filter band 10 to which the invention is applied makes the inverse MDCT transformation process by switching the window appropriately for each block of the input data stream on the basis of the side information. Accordingly, even when the data blocks encoded by various windows are mingled in the input data stream, the decoding process can be appropriately performed.

This invention can be applied to the filter bank of the Daubechies Wavelet Transform that is employed in a still image compression method using a wavelet transformation.

In each of these aspects, in decoding the digital signal from the frequency domain to the time domain, the number of arithmetical operations performed in the filtering and the memory capacity of data required for the operation can be reduced. Therefore, the decoding can be performed more rapidly, and a cost required for decoding is reduced. Further, the power consumption required for the decoding process can be reduced.

Also, in the decoding process, a suitable decoding method can be chosen in accordance with each input data stream.

Further, even when the coded data through various windows is mingled in the input data stream, the decoding process can be appropriately performed.

What is claimed is:

1. A computer implemented filtering method for use in decoding a digital signal from a frequency domain to a time domain, comprising:

inputting a digital signal;

a first step of multiplying an input data stream and a transformation matrix that is decomposed into a sparse matrix from an inverse MDCT transformation matrix for making the inverse MDCT transformation of said input data stream composed of a plurality of data blocks, and has a smaller size than said inverse MDCT transformation matrix, to acquire an output data stream composed of a plurality of data blocks;

a second step of storing predetermined data contained in each data block of the output data stream; and a third step of generating a digital signal in the time domain on the basis of each data block generated in the first step and the predetermined data stored in the second step in processing the data block in the first step, and outputting the digital signal in the time domain generated in the third step, wherein the third step includes determining side information including information regarding decoding of the data block, and switching a processing method used for generating the digital signal in the time domain on the basis of the side information;

the first step includes a fourth step of making a DCT (Discrete Cosine Transform)-IV transformation process for each data block of the input data stream;

the second step includes a fifth step of storing a part of a process result of each data block at the fourth step that is used in processing the data block at the fourth step, and the third step further comprises:

a sixth step of folding back and expanding a part of the process result of each data block in the fourth step other than the part of the process result stored in the fifth step and multiplying the expanded data by a predetermined window to generate a first process result, and folding back and expanding a part of the data block that is stored in the fifth step and multiplying the expanded data by a predetermined window to acquire a second process result, and a seventh step of adding the first and second process results acquired in the sixth step.

2. The filtering method according to claim 1, wherein the third step of switching the processing method includes switching, in the sixth step, the predetermined window by which each data block is multiplied, on the basis of the side information including the information regarding the decoding of the data block.

3. The filtering method according to claim 1, wherein in the first step, the output data stream is generated by matrix transformation on each data block of the input data stream in accordance with the following expression, $$y = C_N^{IV} x$$

where x is a column vector of one data block contained in the input data stream, y is a column vector of output data block corresponding to x, and $C_N^{IV}$ is a DCT-IV transformation matrix represented by the following expression, $$[C_N^{IV}]_{m,n} = \cos\left[\frac{\left(m + \frac{1}{2}\right)\left(n + \frac{1}{2}\right)\pi}{N}\right], 0 \leq m, n \leq N - 1$$

where N is the number of data contained in x.

4. A filtering apparatus for decoding a digital signal from a frequency domain to a time domain, comprising:

transformation means for multiplying an input data stream of the digital signal and a transformation matrix that is decomposed into a sparse matrix from an inverse MDCT (Modified Discrete Cosine Transform) transformation matrix to make an inverse MDCT transformation of the input data stream composed of a plurality of data blocks, and having a smaller size than the inverse MDCT transformation matrix, to generate an output data stream composed of a plurality of data blocks;

memory means for storing predetermined data contained in each data block of the output data stream; and digital signal output means for generating and outputting the digital signal in a time domain on the basis of each data block contained in the output data stream and data of the predetermined data in each data block stored by memory means, wherein said digital signal output means determines side information including information regarding decoding of the data block, and switches a processing method used for generating the digital signal in the time domain on the basis of the side information;

said transformation means makes the DCT (Discrete Cosine Transform)-IV transformation process for each data block of the input data stream;

said memory means stores a part of a process result of each data block of the DCT-IV transformation process that is used in processing the data block; and said digital signal output means further comprises:

multiplication means for folding back and expanding a part of the process result of each data block of the DCT-IV transformation process other than the part of the process result stored in said memory means and multiplying the expanded data by a predetermined window to generate a first process result, and folding back and expanding a part of the data block that is stored in said memory means and multiplying the expanded data by a predetermined window to generate a second process result; and addition means for adding the first and second process results generated by said multiplication means.

5. The filtering apparatus according to claim 4, wherein said multiplication means switches the processing method by switching the predetermined window by which each data block is multiplied, on the basis of the side information including the information regarding decoding the data block.

6. The filtering apparatus according to claim 4, wherein said transformation means generates the output data stream by matrix transformation on each data block of the input data stream in accordance with the following expression, $$y = C_N^{IV} x$$

where x is a column vector of one data block contained in the input data stream, y is a column vector of output data block corresponding to x, and $C_N^{IV}$ is a DCT-IV transformation matrix represented by the following expression, $$[C_N^{IV}]_{m,n} = \cos\left[\frac{\left(m + \frac{1}{2}\right)\left(n + \frac{1}{2}\right)\pi}{N}\right], 0 \leq m, n \leq N - 1$$

where N is the number of data contained in x.

* * * * *